US008650536B2

(12) United States Patent
Betts et al.

(10) Patent No.: US 8,650,536 B2
(45) Date of Patent: Feb. 11, 2014

(54) MODULAR SERVER ARCHITECTURE

(75) Inventors: Christopher Betts, Mount Dandenong (AU); Tony Rogers, Rowville (AU)

(73) Assignee: CA, Inc., Islandia, NY (US)

( * ) Notice: Subject to any disclaimer, the term of this patent is extended or adjusted under 35 U.S.C. 154(b) by 1691 days.

(21) Appl. No.: 11/089,779

(22) Filed: Mar. 25, 2005

(65) Prior Publication Data

US 2005/0235275 A1    Oct. 20, 2005

Related U.S. Application Data

(63) Continuation of application No. 10/888,199, filed on Jul. 9, 2004, now abandoned.

(60) Provisional application No. 60/486,602, filed on Jul. 11, 2003.

(51) Int. Cl.
*G06F 9/44* (2006.01)

(52) U.S. Cl.
USPC .......................................................... 717/108

(58) Field of Classification Search
None
See application file for complete search history.

(56) References Cited

U.S. PATENT DOCUMENTS

| | | | | | |
|---|---|---|---|---|---|
| 5,572,733 | A * | 11/1996 | Ryu et al. | ...................... | 717/104 |
| 5,765,159 | A * | 6/1998 | Srinivasan | ............................ | 1/1 |
| 5,829,006 | A * | 10/1998 | Parvathaneny et al. | ................ | 1/1 |
| 6,199,195 | B1 * | 3/2001 | Goodwin et al. | ............. | 717/104 |
| 6,434,740 | B1 * | 8/2002 | Monday et al. | ............... | 717/108 |
| 6,510,402 | B1 * | 1/2003 | Logan et al. | ................... | 702/186 |
| 7,114,146 | B2 * | 9/2006 | Zhang et al. | .................. | 717/106 |
| 7,152,228 | B2 * | 12/2006 | Goodwin et al. | ............. | 717/146 |
| 7,159,224 | B2 * | 1/2007 | Sharma et al. | ................ | 719/310 |
| 7,246,358 | B2 * | 7/2007 | Chinnici et al. | .............. | 719/315 |
| 7,284,039 | B2 * | 10/2007 | Berkland et al. | .............. | 709/219 |
| 7,434,156 | B1 * | 10/2008 | Leong et al. | .................. | 715/234 |
| 2003/0133554 | A1 * | 7/2003 | Nykanen et al. | ......... | 379/201.01 |
| 2003/0163603 | A1 * | 8/2003 | Fry et al. | ........................ | 709/328 |
| 2003/0191803 | A1 * | 10/2003 | Chinnici et al. | .............. | 709/203 |
| 2003/0204645 | A1 * | 10/2003 | Sharma et al. | ................ | 709/328 |
| 2003/0217044 | A1 * | 11/2003 | Zhang et al. | ...................... | 707/3 |
| 2004/0015840 | A1 * | 1/2004 | Walker | .......................... | 717/108 |
| 2004/0064826 | A1 * | 4/2004 | Lim et al. | ...................... | 719/319 |
| 2004/0117425 | A1 * | 6/2004 | Berkland et al. | .............. | 709/200 |
| 2005/0039166 | A1 * | 2/2005 | Betts et al. | ...................... | 717/114 |
| 2006/0271537 | A1 * | 11/2006 | Chandrasekharan et al. | .... | 707/7 |

FOREIGN PATENT DOCUMENTS

WO    WO 99/33006    7/1999    ............. G06F 17/30

OTHER PUBLICATIONS

Communication pursuant to Article 92(2) EPC; Application No. 04 756 804.3-2211, 5 pages, Mar. 1, 2007.
PCT Written Opinion of the International Searching Authority; Application No. PCT/US2004/021977; 7 pages, Jul. 11, 2003.
"Axis: Java Web Services", by John Callahan; CMS Watch; http://www.cmswatch.com/feature/68-AXIS?printable=1, Apr. 23, 2002.
"Web Services Made Easier: The Java APIs and Architectures for XML; a Technical White Paper", Sun Microsystems, Inc.; XP-002308045, Oct. 2001.
*European Patent Office; Communication Pursuant to Article 94(3) EPC* for Application No. 04 756 804.3-2211; 3 pages, Mar. 30, 2010.

* cited by examiner

*Primary Examiner* — Jason Mitchell
(74) *Attorney, Agent, or Firm* — Baker Botts, L.L.P.

(57) ABSTRACT

A method for using a program to convert a schema to a software data structure includes automatically converting the schema to the software data structure, merging shadow software functionality with the automatically converted software data structure to form a merged software, and executing the merged software.

35 Claims, 6 Drawing Sheets

MODULAR SERVER ARCHITECTURE

REFERENCE TO RELATED APPLICATION

This is a continuation of application Ser. No. 10/888,199 filed Jul. 9, 2004 now abandoned which claims the benefit of Provisional application No. 60/486,602 and filed in the United States on Jul. 11, 2003.

BACKGROUND

1. Technical Field

The present disclosure relates to servers and, more specifically, to modular serve architecture.

2. Description of the Related Art

Extensible Markup Language (XML) is a computer language for structured documents. Structured documents are documents that may contain content as well as descriptions and/or classifications of the content. For example, a structured document may be a book that includes a novel (the content) as well as a description of the novel (the title).

XML is a human-readable computer language. A human-readable computer language is a computer language where the source code may be viewed as standard text and a human reader may be able to interpret the significance of the source code by examining the text. As a human-readable computer language, XML may be interpreted by a wide variety of computer platforms. This feature makes XML an excellent standard for data that is communicated between diverse programs, operating systems and computers.

XML documents may be made up of elements. Each element may be assigned any number of attributes. Attributes may have values.

XML content may be described by using tags. Tags are descriptive captions that appear before and after content and may include attributes and values. Unlike some other computer languages where tags are predefined, such as hypertext markup language (HTML), XML tags may be user defined. XML can therefore use any number of tags to describe any form of content.

Each element in an XML document may be delineated by a start-tag that is presented immediately before the element and an end-tag that is presented immediately after the element.

XML documents may be hierarchical. Hierarchical XML documents may contain a sequence of parent and child elements where one or more elements may be child elements of a patent element. An element is a child element if its tags are situated between the start-tag and end-tag of another element. An element is a patent element if the tags of another element are situated between the parent element's start-tag and end-tag. An element may be both a parent element and a child element as XML documents may have any number of hierarchical generations. The hierarchy of an XML document may be represented as a tree where the highest element of the hierarchy is considered to be the root and inferior generations branch downwards from the root.

An XML document may have an accompanying XML schema. The schema may define one or more object classes that objects within the XML document may conform to. The attributes that may be associated with an object class may be specified within the schema. The schema may establish the hierarchy between objects and define the attributes that may appear in the XML document.

Web services present a new way for computer to communicate with each other. Web services are software systems that can be identified by Universal Resource Identifiers (URI), analogous to identification of websites by Uniform Resource Locator (URL). Web services generally perform specialized functions or provide access to information. Web services generally contain public interfaces and bindings that enable other software systems (such as other web services) to seamlessly utilize its functionality. In this way, web services are transforming the way modern enterprises interact and share information.

Web services commonly communicate by exchanging data in the form of XML documents to facilitate communication of information across various platforms. Therefore as the popularity of web services increases, so does the desire to store and retrieve large numbers of XML documents.

While computer applications such as web services may utilize XML as the preferred language for communicating information, other computer languages may be better suited for the manipulation and processing of information. It is therefore desirable to be able to convert XML documents into other formats.

For example, it may be desirable to convert XML documents into Java programs. Java is a popular object-oriented, platform-independent programming language developed by Sun® Microsystems. A Java program may include software data structures called Java classes that serve to define objects within Java programs. The way in which Java classes define Java objects is analogous to the way in which XML schemas define XML objects as described above.

When converting XML documents to a more convenient format, for example Java, it may be necessary to convert XML schemas to software data structures, for example Java classes. This conversion maybe made manually. Manual conversion of an XML schema to a Java class may include a programmer examining the XML schema object-by-object and manually coding corresponding Java classes. This manual conversion may be labor intensive, often involving hundreds, if not thousands of small, often similar data structures. Additionally, manual conversion may be prone to human error.

If after a manual conversion, the XML schema changes, it may be necessary to manually change the corresponding Java classes. This process may suffer from the same disadvantages as the original conversion process discussed above.

Rather than manually converting XML schemas to Java classes, tools have been developed for automatic conversion. One example of such a tool is Java Architecture for XML Binding (JAXB). JAXB may be used to parse an XML schema generate a set of Java classes that correspond to the object classes of the XML schema being converted.

However, automatic conversion tools such as JAXB may not be able to convert application-specific functionality and may only create static repositories for the XML data. For example, while such automatic conversion may result in a complete Java program, this resulting program might only be useful as a container for storing information and may not have functionality that may be executed. In a normal object-oriented system such as the Java programming language, the limited nature static classes may be overcome by adding additional Java classes that provide functionality. However due to the limited nature of the automatic generation of Java classes, it may not be possible to have additional Java classes automatically added to an existing set of Java classes to extend the functionality of the existing Java classes. Programmers using tools such as JAXB might have to manually write the new extension functionality directly to the automatically generated classes Lo add functionality to the automatically generated Java classes. These manual additions may have to be programmed every time the classes are regenerated. Each time these manual extension functions are written, opportunity for human error is introduced.

It is therefore desirable to convert XML schema to software data structures for example Java classes, without the need for manually adding or modifying the software data structures after they have been generated.

As described above, XML is a popular language for the communication of information between web services and web service users. However, while XML may be a natural choice for the communication of data; it may be very difficult for web services to interpret the great amount of XML data that web services tend to receive from web service users such as other web services.

One traditional approach for the processing of XML data is to utilize large programs on the web service server that examine every element of the XML document according to its hierarchy tree as it makes determination on how to process each element. This approach is prone to error as data that is either not expected or improperly formatted may cause unpredictable and/or difficult to overcome. It is therefore important that data be screened to ensure that data is valid and free from errors, processes known as error checking and validation. This in turn may result in a large body of server code dedicated to error checking and validation. There may also be a substantial risk of failure in this approach.

Programs for validating XML data often belong to one of two types. The "two pass" type validation programs first check to make sure the data is valid and then allows the data to be processed. The "on the fly" type validation programs check the validity of the data as it is processed.

Regardless of the type of validation process used, validation programs generally check to see if the data is properly formatted and of a type that is expected by an application that may make use of the data, for example a web service. If the data is properly formatted and expected, the data may be accepted. If the data is not properly formatted and/or unexpected; the data may be rejected.

Validation often requires that a large number of tests be manually written and used to validate data. Because these programs are often custom written for the data being checked, programming errors are not uncommon. Important tests may be forgotten incorrectly implemented, or rendered obsolete as the XML schema changes. Where such validation problems occur, it is possible that invalid data may be wrongfully accepted. Where invalid data is accepted and sent to an application, for example a web service, consequences may occur. These consequences may range from minor annoyance (for example an inappropriate error message being returned to the user), to disastrous (for example the server may fail completely), to catastrophic (for example a security breach may occur).

Because of the seriousness of this problem, a great deal of time and resources may be spent developing specific validation programs for XML data. Additionally, where the appropriate time and resources are not spent on developing validation programs, the quality of the end product might suffer.

It is therefore desirable to utilize more efficient and effective validation techniques.

In an attempt to break up the complex operation of processing XML data into object oriented modules, programmers may manually structure server code to include a great number of objects for processing particular portions of XML data. Because of the large number of required objects and the possibility of manual error resulting from the manual programming, server code for processing XML documents can potentially be large, messy and/or unstable.

It is therefore desirable to utilize a server that can process XML documents in a clean, modular and object oriented fashion.

SUMMARY

A method for using a program to convert a schema to a software data structure includes automatically converting the schema to the software data structure, merging shadow software functionality with the automatically converted software data structure to form a merged software, and executing the merged software.

A system for using a program to convert a schema to a software data structure includes an automatic-conversion unit for automatically converting the schema to the software data structure, a shadow merging unit for merging shadow software functionality with the automatically converted software data structure to form a merged software, and an executing unit for executing the merged software.

A computer system includes a processor and a program storage device readable by the computer system, embodying a program of instructions executable by the processor to perform method steps for using a program to convert a schema to a software data structure. The method includes automatically converting the schema to the software data structure, merging shadow software functionality with the automatically converted software data structure to form a merged software, and executing the merged software.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

According to embodiments of the present disclosure, schema, for example XML schema, that have been automatically converted to software data structures, for example Java classes, using an automatic converter, for example JAXB, may be enhanced with functionality without introducing excessive risk of manual error.

Embodiments of the present disclosure may utilize shadow software files for example shadow class files, that contain the enhanced functionality to be added to the automatically converted Java classes. The shadow class files may then be automatically merged with the automatically converted Java classes to produce enhanced Java classes wile minimizing the risk of manual error associated with manually adding the desired enhancements.

While some embodiments of the present disclosure convert schema to lava classes, other embodiments of the present disclosure convert schema to other software data structures or source code constructs. For example schema may be converted to Microsoft® C# programming language software structures.

Figure 1:
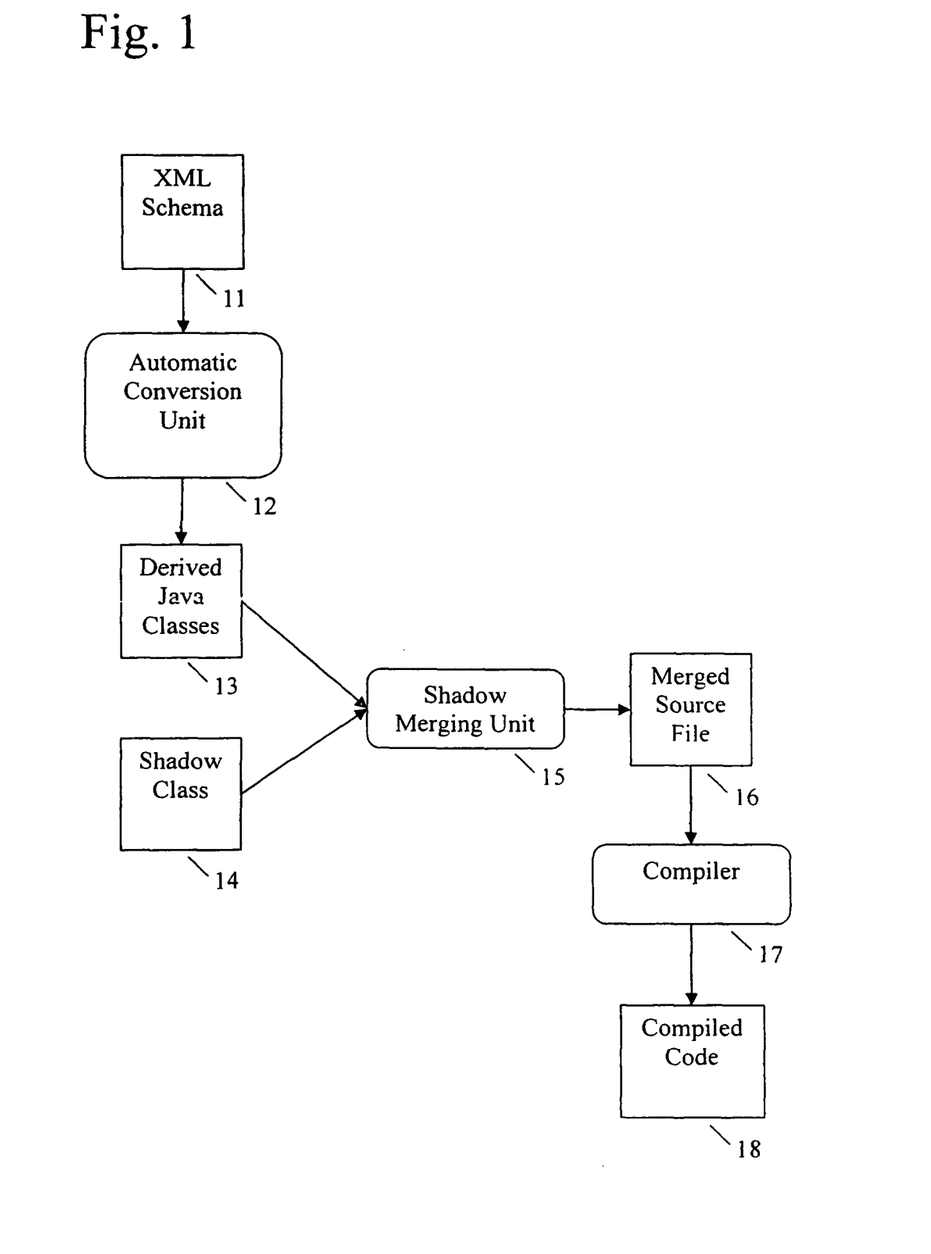
FIG. 1 is a block diagram showing how an XML schema may be converted to a software data structure, for example, Java classes, according to an embodiment of the present disclosure.

FIG. 1 is a block diagram showing how an XML schema may be converted to a software data structure, for example, Java classes, according to an embodiment of the present disclosure. A schema file, for example an XML schema file 11, may be automatically converted to a software data structure, for example Java classes. This automatic conversion may be carried out by an automatic conversion unit 12, for example a unit utilizing JAXB. This conversion may result in derived Java classes 13. However, as described above, the resulting Java derived classes 13 may lack application-specific functionality and may only include static repositories for the XML data.

Shadow class source files 14 may be used to extend and enhance the derived Java classes 13. The shadow class source files 14 may be Java extension class source files. The shadow class source files 14 may be valid Java classes that extend the derived Java classes 13 in a substantially syntactically correct fashion. Because the shadow class source files 14 may be valid Java classes, they are complete Java files and not fragments of code to be inserted into other Java files. The shadow class source files 14 may be syntactically correct, object-oriented inheritance classes developed for each of the derived Java classes 13 to be extended.

By using shadow class source files 14, developer generated code and automatically generated code may be separately maintained. This may make maintenance easier because there may be only a handful of shadow class source files 14 compared to hundreds or thousands of derived Java classes 13 that may need extension. If shadow class source files 14 were not used, each of the hundreds or thousands of the manually extended derived Java classes may need to be maintained.

By using shadow class source files 14 that are complete Java files, multiple advantages may be realized. For example, interactive development environments (IDEs) may be used to support the process of writing the Java class source files 14. IDEs are programming tools that are used to help write software. IDEs may not be useful for supporting the process of writing fragments of code. For example, shadow class source files 14 that are complete Java files may be independently compiled and may be run as part of a unit test to verify that the file has been properly developed. For example, when developing shadow class source files 14 that are complete Java files, it is more likely that errors, such as inconsistent import statements variable name space clashed, etc. will be detected as part of the normal development process.

A shadow merging unit 15 may take the derived Java classes 13 and the shadow classes 14 and merge them to form a merged source file 16. The details of this merger are discussed below. This process may be fully automated and need not introduce manual error. Merged source files 16 may be used as if they were derived Java classes 13, however, the merged source files 16 may contain the extended functionality. For example, a compiler 17 may be used to compile the merged source file 16 resulting in executable compiled merged code 18.

Figure 2:
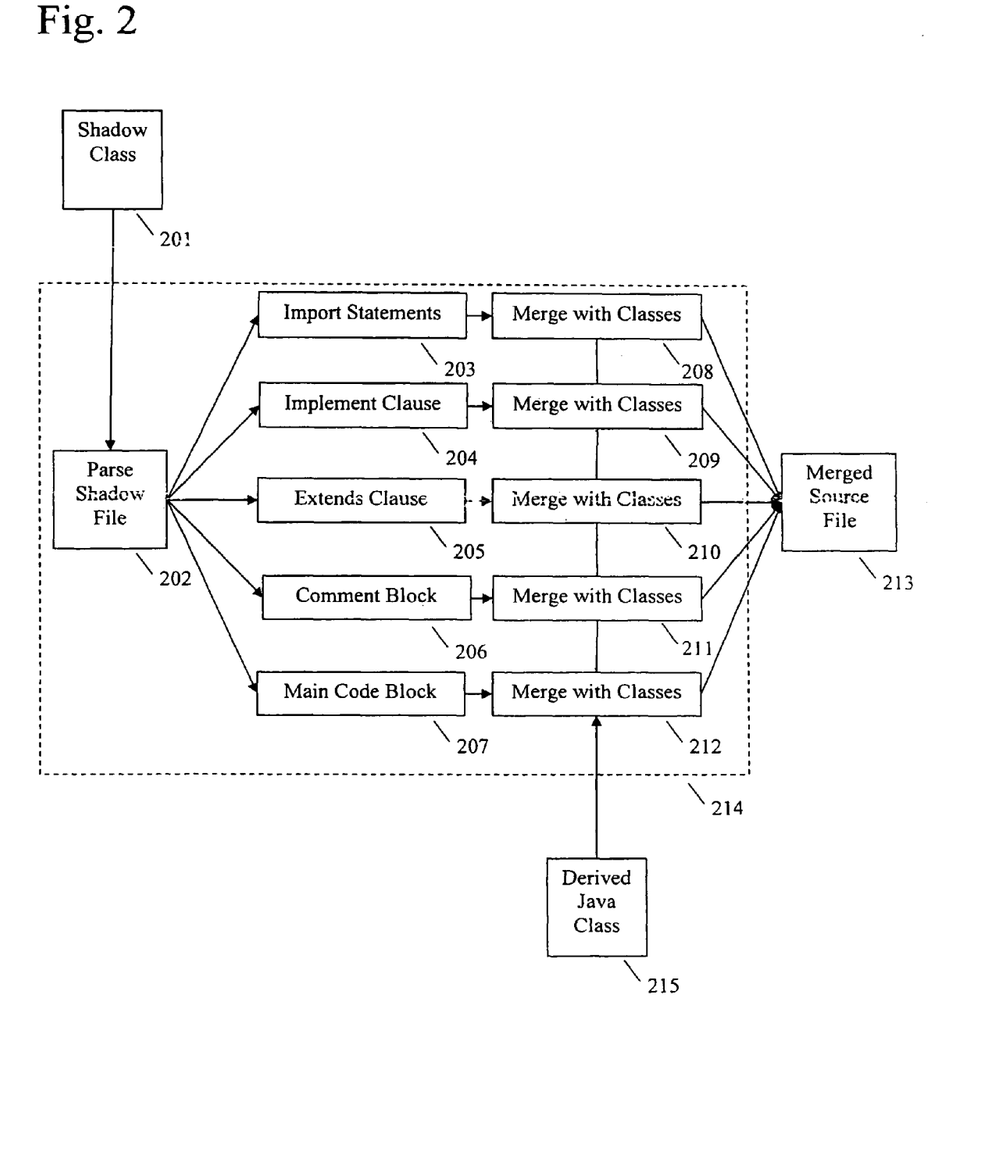
FIG. 2 is a block diagram showing how derived Java classes may be merged with shadow classes according to an embodiment of the present disclosure.

FIG. 2 is a block diagram showing how derived Java classes 215 may be merged with shadow classes 201. A shadow merging unit 214 may automatically combine the derived Java classes 215 with the shadow classes 201 without the risk of introducing manual error. The shadow classes 201 may be parsed one shadow class 201 at a time. The Shadow class 201 may be parsed by a parser 202 within the shadow merging unit 214. The parser 202 may isolate portions of the shadow class 201. For example, a list of import statements 203 may be isolated, implements clause 204 may be isolated, extends clause 205 may be isolated, preliminary comment block 206 may be isolated, and the main code block 207 (the code found within the start-tag and end-tag of the main class declaration).

A Java class 215 corresponding to the shadow class 201 currently analyzed may be selected. Each isolated portion 203-207 of the shadow class 201 may then be automatically compared, for example line-by-line with a corresponding portion of the corresponding derived Java class 215. Characteristics (e.g. statement said clauses) 208-212 that are only found in the shadow class 201 but are not found in the derived Java class 215 may then be merged into the derived Java class 215. For example, if an import statement is found in the isolated import statements 203 section of the shadow class 201 and that import statement is not also found in the corresponding section of the corresponding derived java class 215, then that import statement will be merged 208 with the corresponding section of the corresponding derived java class 215. For example, if an implement clause is found in the isolated implement clause 204 section of the shadow class 201 and that implement clause is not also found in the corresponding section of the corresponding derived java class 215, then that implement clause will be merged 209 with the corresponding section of the corresponding derived java class 215. For example if an extends clause is found in the isolated extends clause 205 section of the shadow class 201 and that extends clause is not also found in the corresponding section of the corresponding derived java class 215, then that extends clause will be merged 210 with the corresponding section of the corresponding derived java class 215. For example, if a comment block is found in the isolated comment block 206 section of the shadow class 201 and that comment block is not also found in the corresponding section of the corresponding derived java class 215, then that comment block will be merged 211 with the corresponding section of the corresponding derived java class 215. For example, if a main code block is found in the isolated main code block 207 section of the shadow class 201 and that main code block is not also found in the corresponding section of the corresponding derived java class 215, then that main code block will be merged 212 with the corresponding section of the corresponding derived java class 215.

Figure 3:
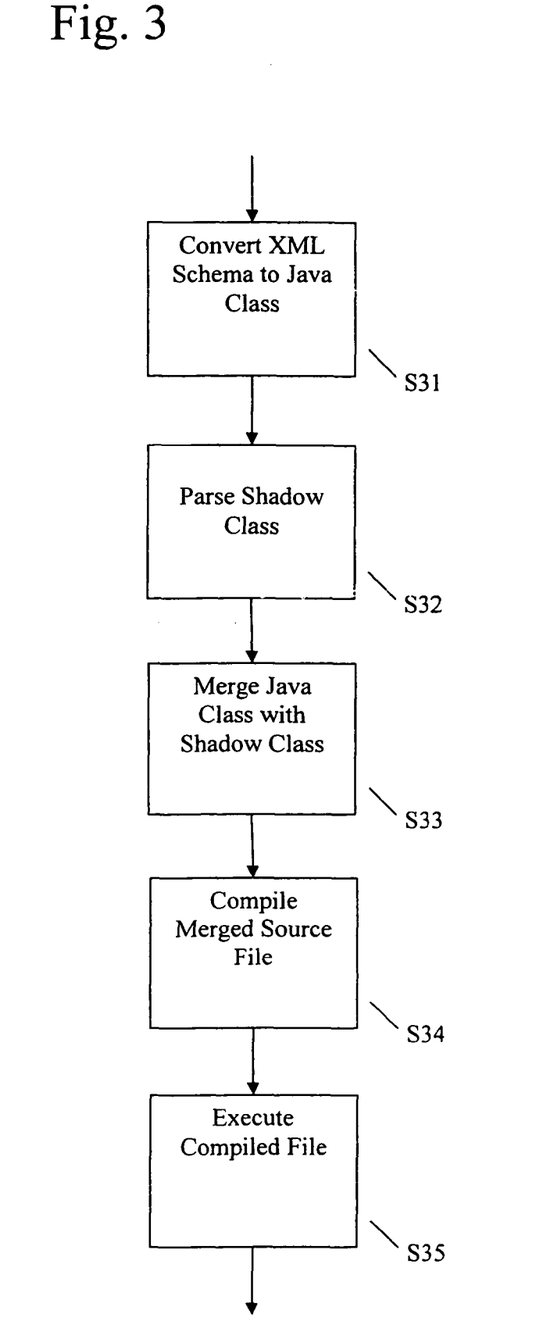
FIG. 3 is a flow chart illustrating an embodiment of the present disclosure.

FIG. 3 is a flow chart illustrating an embodiment of the present disclosure. One or more schema, for example an XML schema, may be automatically converted to one or more software data structures, for example Java classes (Step S31). Shadow software data structures, for example shadow classes, may be used to extend the functionality of the converted software data structures. These shadow classes may be parsed (Step S32). Characteristics that are found in the parsed shadow classes but are not found in the corresponding section of the corresponding software data structure may be merged into the software data structure (Step S33) to form a merged software data structure for example a merged source file. The resulting merged source file may be compiled (Step S34). The compiled merged file may then be executed (Step S35) for example by callings an execute( ) function that has been incorporated into the compiled merged file.

Embodiments of the present disclosure may be applied to servers running web services or other servers utilizing XML, to allow for the simple, efficient, and effective parsing of XML documents that may be received by web services and/or other applications running on the servers. Use of these embodiments of the present disclosure may therefore reduce the amount of code needed to run such servers. This has the potential to greatly simplify the writing of server code and may allow for gradual, modular implementation of complex server programs as functionality is added to the otherwise static data classes.

Figure 4:
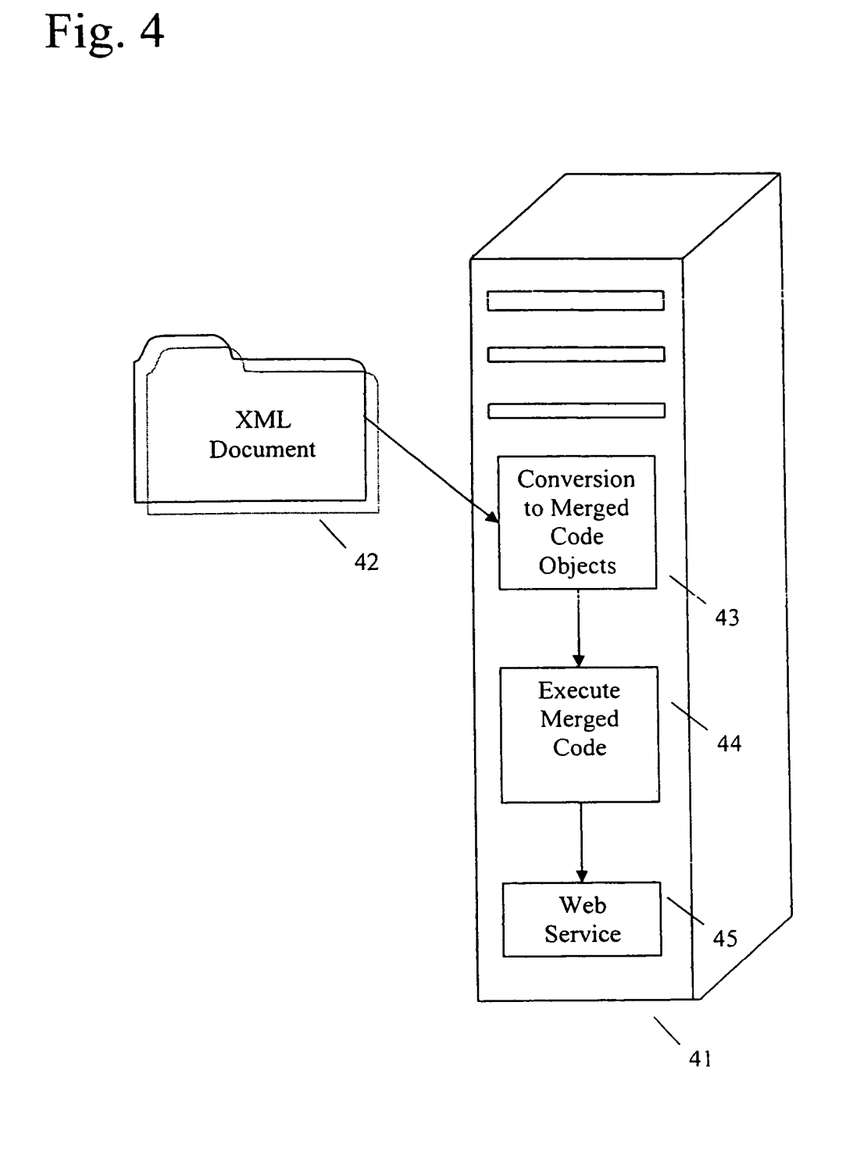
FIG. 4 is a block diagram showing the handling XML of documents according to an embodiment of the present disclosure.

FIG. 4 is a block diagram showing an embodiment of the present disclosure applied to a server for handling XML documents.

A server 41, for example, a web service server, may be sent an XML document 42. This XML document 42 may be data intended as input for a web service 45 running on the server 41. The XML document 42 may be automatically converted into a software data structure, for example Java classes using an automatic conversion unit 43, for example a JAXB-based automatic conversion unit. The server may also contain a unit 44 containing code derived from the merging of shadow code with the JAXB derived code, which has added functionality to the converted data structures. Applications, for example web services 45, may then execute the various functionality of the converted and merged data structures and shadow class functionality, here referred to as smart data classes: The smart data class may be executed, for example, by calling an execute( ) function within the smart data class that may have been introduced during the shadow merge.

For example, the server 41 may run Apache Axis. Apache Axis is a Java-based Apache Simple Object Access Protocol (SOAP) toolkit that can be used to run a web services on servers. Apache Axis may include an XML parser as the automatic conversion unit.

Execution of smart data classes may significantly simplify the architecture of an XML based web service program. Execution of the smart data classes may be standardized so that the smart data classes may be similarly executed regardless of the nature of the original XML document 42. As a result, the same code may be used to handle multiple forms of XML documents potentially reducing the amount of code needed to process XML documents.

Additionally, execution of the smart data classes may reduce the need for error checking and validation code that is often required of XML parsers that examine every element of the XML document according to its hierarchy tree as it makes determination on how to process each element.

One example of a standardized execution of smart data classes is to first execute the top level data class. The top level data class is the smart data class corresponding to the root object of the XML document's hierarchy. Executing the top level data class may then result in the execution of inferior smart data classes as they are required for the execution of the top level data class.

A smart data class may not be executable, for example, if no functionality has been added to that particular smart data class during the shadow class merge. In such a case, the particular smart data class is a static data object. Attempted execution of such a static data object may be set to result in a harmless "functionality not implemented" error or similar.

Figure 5:
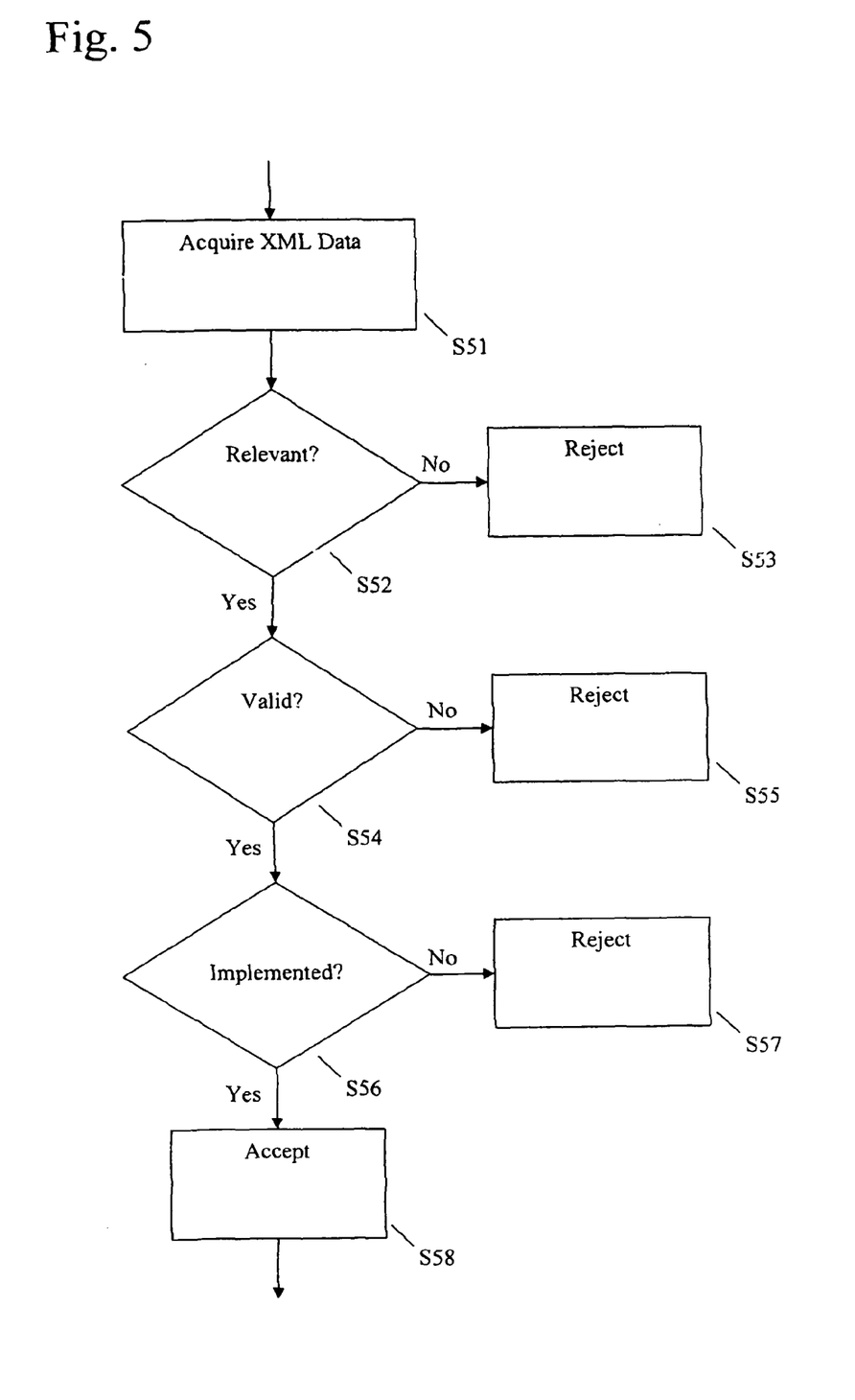
FIG. 5 is a flow chart illustrating a validation process according to an embodiment of the present invention.

Techniques of the present disclosure may be used to validate XML data that may be received, for example by a web service running on a server. Because of advantages of the present disclosure, validation according to an embodiment of the present disclosure may be efficient and effective. FIG. 5 is a flow chart illustrating a validation process according to an embodiment of the present invention.

Once smart data classes have been obtained according to embodiments of the present disclosure, data may be acquired (Step S51). For example, data may be acquired from a user who has send data to a web service. This acquired data, for example an acquired XML document, may be examined to gauge whether the data is relevant to the function that has received the data (Step S52). For example, if a request for a weather report is received by a financial billing web service, the data may not be relevant (No Step S52). This determination can be made by examining the classes of the objects of the XML document to determine if they correspond to one of the smart data classes. If they correspond (Yes Step S52) then the next test may be performed (Step S54). If they do not correspond (No Step S52) then the data may be rejected as irrelevant (Step S53).

The next test may be to determine whether the data is valid (Step S54). Valid data is data that conforms to the syntax expressed in the corresponding smart data class. This may be determined by using the smart data class to automatically create an instance of an object conforming to the smart data class and initialize this object with data fields from the data. Initialization may either complete successfully or may fail. If for example there is a mismatch between the fields of the object and the fields of the data, or if the data is of a type and/or value unacceptable to the object then the initialization may fail. Where the data conforms to the syntax expressed in the corresponding smart data class (Yes S54) then the next test (Step S56) may be performed. If it does not (No Step S54) then the data may be rejected as invalid (Step S55).

The next test may be to determine if the data may be implemented (Step S56). If the smart data class contains functionality that can be executed, for example an execute( ) function, then execution may be attempted for the object that has been initialized with the data. The success of this test may then be contingent on whether the object can be successfully executed. If the object does not have an execute( ) method, for example it is simply a static data object containing XML data and contains no functionality, then execution will fail and an error message may be returned. Where the function may not be implemented (No Step S56), the data may be rejected (Step S57). Where the function may be implemented (Yes Step S56) the data may be accepted (Step S58). Accepted data is data that may be executed, for example by a web service.

Figure 6:
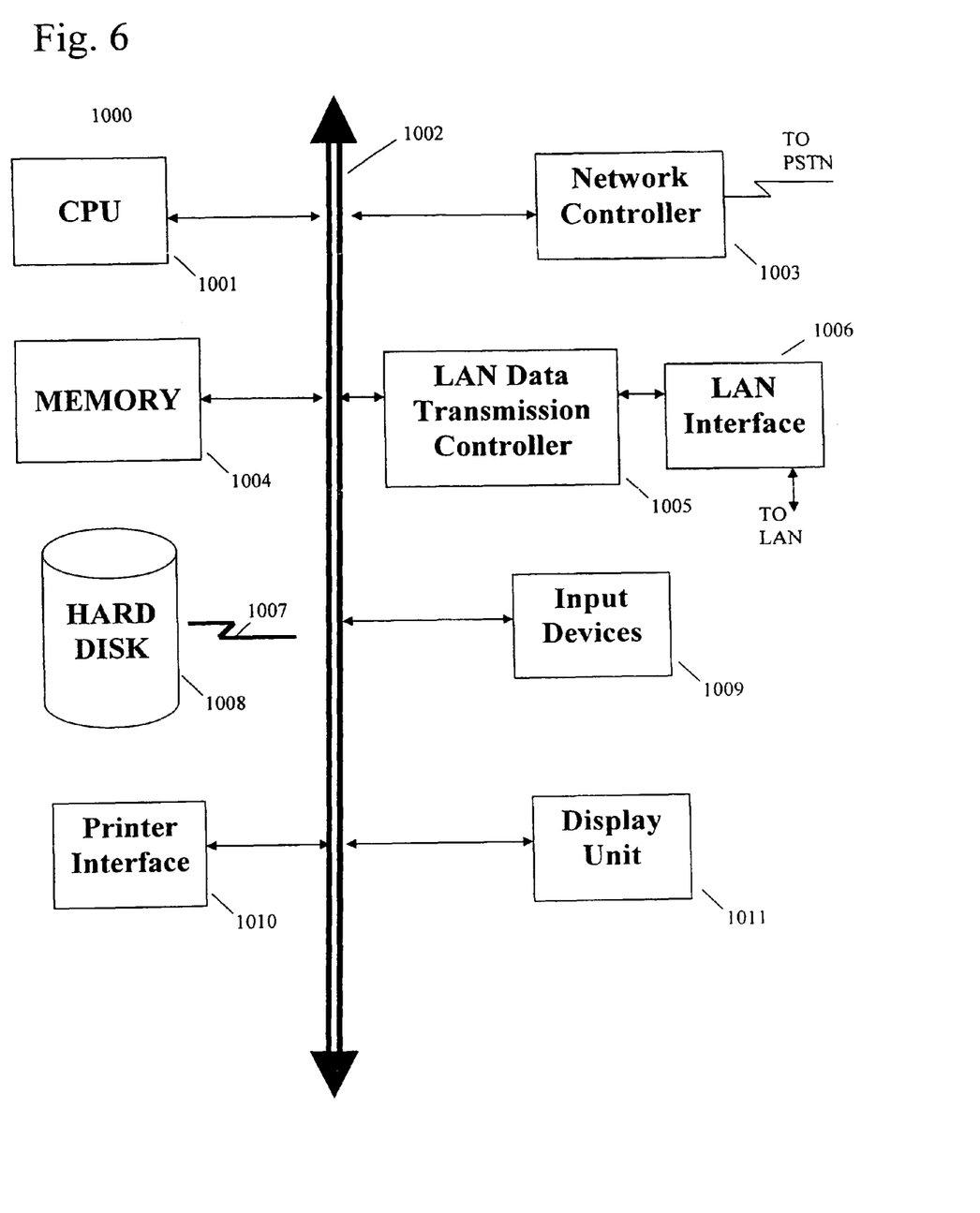
FIG. 6 shows an example of a computer system capable of implementing the method and apparatus according to embodiments of the present disclosure.

FIG. 6 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1002.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method comprising:
    receiving at a server a structured document that is being transmitted to one or more applications, wherein the structured document comprises a static object and a functional object that conform to one or more object classes;
    automatically converting the structured document into a software data structure that comprises the static object and functional object of the structured document converted to conform to one or more derived classes, wherein the converted functional object lacks functionality that can be executed by the one or more applications;
    merging a shadow class file with at least the converted functional object of the software data structure to form a merged software data structure that comprises the static object and the functional object of the structured document with at least the functional object being further converted to conform to one or more shadow classes, wherein the shadow class file merged with the converted functional object adds functionality that allows the converted functional object to be executed by the one or more applications; and
    performing an error checking and validation process at the server, which comprises rejecting data provided in the static object so that the data provided in the static object is not received by the one or more applications.

2. The method of claim 1, wherein at least one of the one or more applications is a web service.

3. The method of claim 1, wherein the structured document is an XML document.

4. The method of claim 1, wherein:
    the one or more object classes are defined by an XML schema;
    the one or more derived classes are derived Java classes; and
    the one or more shadow classes are shadow Java classes.

5. The method of claim 4, wherein a JAXB compiler automatically converts the structured document into the software data structure.

6. The method of claim 4, wherein the server is configured to execute Apache Axis to automatically convert the structured document into the software data structure.

7. The method of claim 1, wherein:
    the one or more object classes are defined by an XML schema;
    the one or more derived classes are derived C# classes; and
    the one or more shadow classes are C# shadow classes.

8. The method of claim 1, wherein merging the shadow class file with the software data structure to form the merged software data structure comprises:
    parsing the shadow class file into one or more sections;
    determining if one or more characteristics are present in the parsed shadow class file that are not present in the software data structure; and
    adding the one or more characteristics determined to be present in the parsed shadow class file that are not present in the software data structure to the software data structure when it is determined that there are one or more characteristics present in the parsed shadow class file that are not present in the software data structure.

9. The method of claim 8, wherein the one or more sections includes one or more of the following sections:
    import statements;
    implement clause;
    extends clause;
    comment block; and
    main code block.

10. The method of claim 1, wherein performing an error checking and validation process at the server further comprises:
    compiling the merged software data structure into executable code; and
    attempting to execute the executable code.

11. The method of claim 1, further comprising:
    creating an instance of the functional object that conforms to the one or more object classes;
    selecting one or more data fields from the structured document; and
    attempting to initialize the instance of the functional object using the selected one or more data fields.

12. The method of claim 11, further comprising:
    attempting to execute the initialized instance of the functional object if the attempt to initialize the instance of the functional object is successful; and
    generating an error message if either the attempt to initialize the instance of the functional object fails or the attempt to execute the initialized instance of the functional object fails.

13. The method of claim 1, wherein:
    the one or more object classes comprise:
        a top level data class that corresponds to a root object of the structured document, and
        one or more lower-level data classes that are required for the execution of the top level data class; and
    performing an error checking and validation process at the server further comprises executing a shadow class that corresponds to the top level data class prior to executing a shadow class that corresponds to the the one or more lower-level data classes.

14. Logic encoded in tangible computer readable media, the logic comprising:
    receiving code operable to receive at a server a structured document that is being transmitted to one or more applications, wherein the structured document comprises a static object and a functional object that conform to one or more object classes;
    automatic-conversion code operable to automatically convert the structured document into a software data structure that comprises the static object and functional object of the structured document converted to conform to one or more derived classes, wherein the converted functional object lacks functionality that can be executed by the one or more applications;
    shadow merging code operable to merge a shadow class file with at least the converted functional object of the software data structure to form a merged software data structure that comprises the static object and the functional object of the structured document with at least the functional object being further converted to conform to one or more shadow classes, wherein the shadow class file merged with the converted functional object adds functionality that allows the converted functional object to be executed by the one or more applications; and error checking and validation code operable to reject data provided in the static object so that the data provided in the static object is not received by the one or more applications.

15. The logic of claim 14, wherein at least one of the one or more applications is a web service.

16. The logic of claim 14, wherein the structured document is an XML document.

17. The logic of claim 14, wherein:
the one or more object classes are defined by an XML schema;
the one or more derived classes are derived Java classes; and
the one or more shadow classes are shadow Java classes.

18. The logic of claim 17, wherein the automatic-conversion code comprises a JAXB compiler configured to automatically convert the structured document into the software data structure.

19. The logic of claim 17, wherein the server is configured to execute Apache Axis to automatically convert the structured document into the software data structure.

20. The logic of claim 14, wherein:
the one or more object classes are defined by an XML schema;
the one or more derived classes are derived C# classes; and
the one or more shadow classes are shadow C# classes.

21. The logic of claim 14, wherein the shadow merging code comprises:
parsing code operable to parse the shadow class file into one or more sections;
determining code operable to determine if one or more characteristics are present in the parsed shadow class file that are not present in the software data structure; and
adding code operable to add the one or more characteristics determined to be present in the parsed shadow class file that are not present in the software data structure to the software data structure when it is determined that there are one or more characteristics present in the parsed shadow class file that are not present in the software data structure.

22. The logic of claim 21, wherein the one or more sections includes one or more of the following sections:
import statements;
implement clause;
extends clause;
comment block; and
main code block.

23. The logic of claim 14, wherein the error checking and validation code is further operable to:
compile the merged software data structure into executable code; and
attempt to execute the executable code.

24. The logic encoded in tangible computer readable media of claim 14, wherein:
the one or more object classes comprise:
a top level data class that corresponds to a root object of the structured document, and
one or more lower-level data classes that are required for the execution of the top level data class; and
the error checking and validation code is further operable to execute a shadow class that corresponds to the top level data class prior to executing a shadow class that corresponds to the one or more lower-level data classes.

25. A computer system comprising:
a processor; and
a program storage device readable by the computer system, embodying a program of instructions executable by the processor to perform a method comprising:
receiving at a server a structured document that is being transmitted to one or more applications, wherein the structured document comprises a static object and a functional object that conform to one or more object classes;
automatically converting the structured document into a software data structure that comprises the static object and functional object of the structured document converted to conform to one or more derived classes, wherein the converted functional object lacks functionality that can be executed by the one or more applications;
merging a shadow class file with at least the converted functional object of the software data structure to form a merged software data structure that comprises the static object and the functional object of the structured document with at least the functional object being further converted to conform to one or more shadow classes, wherein the shadow class file merged with the converted functional object adds functionality that allows the converted functional object to be executed by the one or more applications; and
rejecting data provided in the static object so that the data provided in the static object is not received by the one or more applications.

26. The computer system of claim 25, wherein at least one of the one or more applications is a web service.

27. The computer system of claim 25, wherein the structured document is an XML document.

28. The computer system of claim 25, wherein:
the one or more object classes are defined by an XML schema;
the one or more derived classes are derived Java classes; and
the one or more shadow classes are shadow Java classes.

29. The computer system of claim 28, wherein a JAXB compiler automatically converts the structured document into the software data structure.

30. The computer system of claim 28, wherein the server is configured to execute Apache Axis to automatically convert the structured document into the software data structure.

31. The computer system of claim 25, wherein:
the one or more object classes are defined by an XML schema;
the one or more derived classes are derived C# classes; and
the one or more shadow classes are shadow C# classes.

32. The computer system of claim 25, wherein merging the shadow software functionality with the software data structure to form the merged software data structure comprises:
parsing the shadow class file into one or more sections;
determining if one or more characteristics are present in the parsed shadow class file that are not present in the software data structure; and
adding the one or more characteristics determined to be present in the parsed shadow class file that are not present in the software data structure to the software data structure when it is determined that there are one or more characteristics present in the parsed shadow class file that are not present in the software data structure.

33. The computer system of claim 32, wherein the one or more sections includes one or more of the following sections:

import statements;
implement clause;
extends clause;
comment block; and
main code block.

34. The computer system of claim 25, wherein the program of instructions is further executable by the processor to perform a method that comprises:
compiling the merged software data structure into executable code; and
attempting to execute the executable code.

35. The computer system of claim 25, wherein:
the one or more object classes comprise:
a top level data class that corresponds to a root object of the structured document, and
one or more lower-level data classes that are required for the execution of the top level data class; and
the program of instructions is further executable by the processor to perform a method that comprises executing a shadow class that corresponds to the top level data class prior to executing a shadow class that corresponds to the one or more lower-level data classes.

\* \* \* \* \*